United States Patent
Strait

(10) Patent No.: US 8,184,755 B2
(45) Date of Patent: May 22, 2012

(54) SYMBOL SYNCHRONIZATION FOR COMMUNICATION

(75) Inventor: Jeff Strait, Reno, NV (US)

(73) Assignee: Metanoia Technologies, Inc., Austin, TX (US)

( * ) Notice: Subject to any disclaimer, the term of this patent is extended or adjusted under 35 U.S.C. 154(b) by 1194 days.

(21) Appl. No.: 10/978,336

(22) Filed: Nov. 1, 2004

(65) Prior Publication Data

US 2006/0093050 A1    May 4, 2006

(51) Int. Cl.
*H04L 7/00* (2006.01)

(52) U.S. Cl. ........ 375/354; 375/260; 375/371; 375/219; 375/222; 375/316; 455/59; 370/503; 370/516

(58) Field of Classification Search .................. 375/354, 375/362, 260, 371, 219, 222, 316; 455/59; 370/503, 516

See application file for complete search history.

(56) References Cited

U.S. PATENT DOCUMENTS

| | | | | |
|---|---|---|---|---|
| 5,579,338 A | * | 11/1996 | Kojima | 375/149 |
| 5,974,087 A | * | 10/1999 | Nowara | 375/226 |
| 6,438,186 B1 | * | 8/2002 | Strait | 375/354 |
| 7,050,419 B2 | * | 5/2006 | Azenkot et al. | 370/347 |
| 2005/0276339 A1 | * | 12/2005 | Chow et al. | 375/260 |
| 2005/0276340 A1 | * | 12/2005 | Chow et al. | 375/260 |

* cited by examiner

*Primary Examiner* — Chieh M. Fan
*Assistant Examiner* — Leila Malek
(74) *Attorney, Agent, or Firm* — Lee & Hayes, PLLC

(57) ABSTRACT

A communication system and method is disclosed that performs symbol boundary synchronization by generating a symbol alignment estimate from a partial signal correlation; and then refining the symbol alignment estimate via a carrier phase calculation. To generate the symbol alignment estimate, two methods are disclosed. After an estimate is determined, an embodiment provides for refining the symbol alignment estimate via a carrier phase calculation by determining a carrier phase of two adjacent carriers, determining a phase error as directly proportional to an offset from the start of a symbol, determining a phase difference contribution due to a communication channel and device hardware, and counter-rotating the determined carrier phase by an angle of a constellation point at a transmitter.

12 Claims, 4 Drawing Sheets

Perform a partial signal correlation that approaches an actual symbol boundary
210

Perform a carrier phase refinement to produce a more accurate symbol alignment estimate
220

SYMBOL SYNCHRONIZATION FOR COMMUNICATION

TECHNICAL FIELD OF THE DISCLOSURE

This disclosure pertains to the field of multicarrier transceivers, and, more particularly, to a partial signal symbol synchronization for fast data rate communication systems such as VDSL.

BACKGROUND OF THE DISCLOSURE

There is a growing need among both individuals and enterprises for access to a commonly available, cost effective network that provides speedy, reliable service. The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Internet Explorer, the use of graphics, audio, video and text has surged on the Internet. Although graphics, audio and video make for a much more interesting way to view information as opposed to plain text, bandwidth consumption is significantly higher. A simple background picture with accompanying text requires approximately ten times the bandwidth needed by text alone. Real-time audio and streaming video typically need even more bandwidth. Because of the increased requirement for bandwidth, activities such as browsing home pages or downloading graphics, audio and video files can take a frustratingly long period of time. As use of the Internet and online services continues to spread, so does the use of more complex applications, such as interactive video games, telecommuting, business to business communications and videoconferencing. These complex applications place severe strains on data networks because of the intensive bandwidth required to deliver data-rich transmissions. The lack of available bandwidth in data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, videoconferencing or full-motion video viewing. Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

Fiber to the home (FTTH) is still prohibitively expensive in the marketplace. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). The system transmits high-speed data over short reaches of twisted pair copper telephone lines, with a range of speeds depending upon actual line length.

The VDSL standard as provided by the ANSI T1E1.4 Technical Subcommittee, provides guidelines for the transmitter and receiver within the VDSL modem. Unlike ADSL, very high bit rate DSL (VDSL) is capable of providing speeds of 52 Mbps downstream and 16 Mbps upstream. ADSL is capable of 10 Mbps downstream and 800 Kbps upstream. Other standards beyond ADSL and VDSL are being considered by standards bodies. For example, VDSL2 is one such standard. VDSL standards employ discrete multi-tone modulation (DMT) as the modulation technology. The training sequences for VDSL and future DMT modems require partially blind receivers in that certain carriers may be used to transmit messages rather than being specified a priori. Therefore, receiver training methods must recognize this structure and be designed to operate in an optimal fashion in the presence of randomized signal components on some of the DMT carriers. For example, in the VDSL multicarrier standard an interleaved training signal is defined such that even numbered carriers carry fixed and predetermined bit patterns while odd numbered carriers carry message bits that must be considered random until such time that the receiver can accurately demodulate and decode the signal.

Receiver modules such as symbol synchronization, equalization, echo cancellation, and sample clock synchronization must be designed to adapt to unknown channel and impairment conditions while partially blinded. Timing recovery in the form of both symbol alignment and sample clock synchronization is typically the first step in receiver training. What is needed is an efficient method for symbol alignment in a DMT receiver for any incoming DMT symbol train.

SUMMARY OF THE INVENTION

A communication system and method is disclosed that performs symbol boundary synchronization by generating a symbol alignment estimate from a partial signal correlation; and then refining the symbol alignment estimate via a carrier phase calculation. To generate the symbol alignment estimate, two methods are disclosed. A first method generates the estimate by measuring an average pilot carrier over a block of symbols using a single carrier to monitor a signal to noise ratio (SNR), determining a noise measurement using the average pilot carrier over the block of symbols, indexing a symbol starting point, and performing an indexed search until the search covers a full discrete multi-tone (DMT) symbol.

The noise measurement can be a minimum noise variance value that is maintained throughout the indexed search and used as a coarse symbol alignment point after the search covers the full DMT symbol.

The search can include selecting a pilot tone and an indexing offset value such that the index spans an integer number pilot tone periods to enable a sample timing recovery system to maintain a constant phase reference as an assumed symbol alignment point is hopped through the search range.

According to an alternate embodiment, the generating the symbol alignment estimate can include receiving a training signal, determining the length of the cycle extension, using known constellation points to manage symbol alignment, identifying each symbol as the sum of a periodic known signal and a random signal, characterizing the cross-correlation of the channel output with the periodic component of the transmitted signal as the sum of a first convolution and a second convolution, ignoring the first convolution, the first convolution being a cross-correlation between two partial sequences, because the first convolution can be approximated as zero, and using the second convolution as an estimate of the effective channel impulse response.

After an estimate is determined according to either method, an embodiment provides for refining the symbol alignment estimate via a carrier phase calculation by determining a carrier phase of two adjacent carriers, determining a phase error as directly proportional to an offset from the start of a symbol, determining a phase difference contribution due to a communication channel and device hardware, and counter-rotating the determined carrier phase by an angle of a constellation point at a transmitter.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

In the following description, for purposes of explanation and not limitation, specific details are set fourth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, devices, and circuits are omitted so as not to obscure the description of the present invention with unnecessary details.

Figure 1:
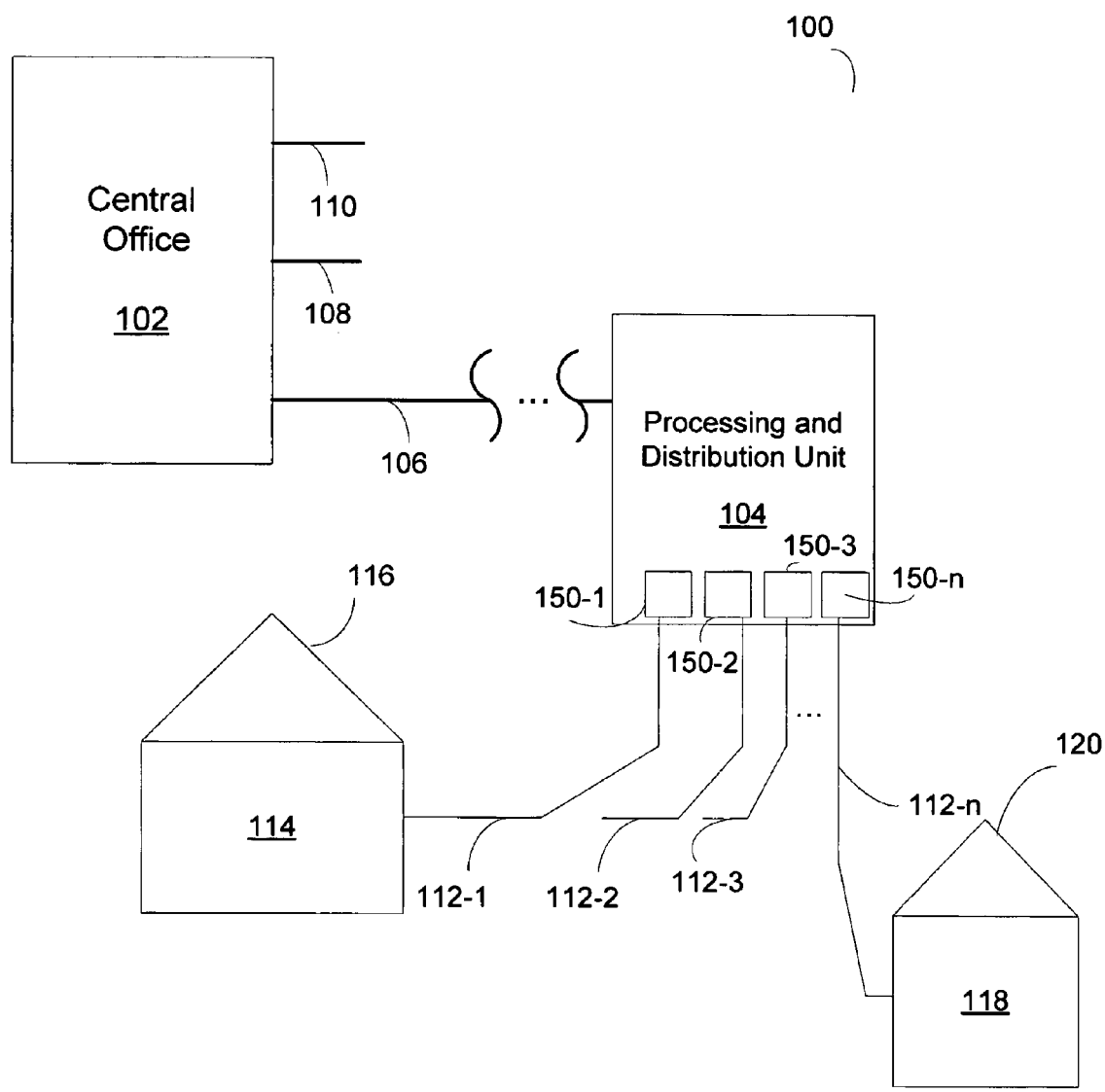
FIG. 1 is a block diagram showing a digital subscriber line system appropriate for implementing embodiments of the present invention.

With reference to FIG. 1, a block diagram illustrates an exemplary DMT-based communications network 100 suitable for implementing the invention. A central office (CO) 102 serves a plurality of distribution posts, such as processing and distribution unit 104, to provide data transmission to/from central office 102 from/to various remote units. Central office 102 and processing and distribution unit 104 are interconnected by a high-speed multiplexed transmission line 106, e.g. a fiber optic line in which case processing and distribution unit 104 typically is referred to as an optical network unit (ONU). Lines 108 and 110 indicate that central office 102 may as well be connected to other processing and distribution units.

Processing and distribution unit 104 includes digital DMT-based transceivers, for example, modems 150-1 through 150-n. processing and distribution unit 104 serves a plurality of discrete subscriber lines 112-1 to 112-n, each of which typically serves a single end user. Specifically, first 116 and second 120 end users have remote units 114, 118, respectively, suitable for duplex or full duplex communication with processing and distribution unit 104 at high bit rates. Remote units 114 and 118 may be incorporated in a variety of devices such as for instance telephones, televisions, monitors, computers etc. It should be noted that several remote units may be connected to a single subscriber line.

Modems 150 operate using orthogonal frequency division multiplexed carriers (OFDM carriers) for discrete multi-tone (DMT) transmissions. Modems 150 load according to each carrier's capacity determined during initial training and analysis periods.

Proper symbol boundary synchronization in modems 150 is critical for optimum performance of DMT modulation. Improper symbol alignment causes performance deterioration through poor equalizer alignment and convergence, thereby increasing inter-symbol interference (ISI). If the symbol alignment error exceeds the length of equalizer support, training will be suboptimal or fail. It has been discovered that to maintain equalizer performance at a specific level, the support of the equalizer filter should be increased by the uncertainty of the offset estimate.

Figure 2:
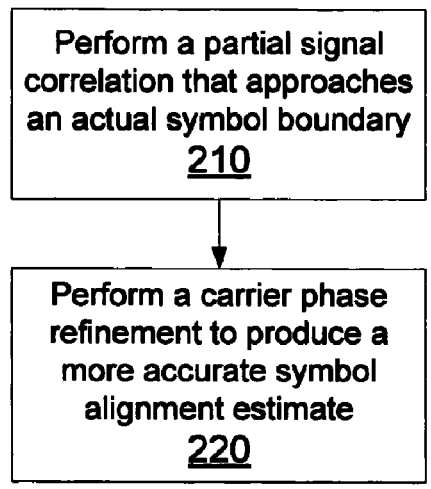
FIG. 2 is a flow diagram illustrating a method in accordance with an embodiment of the present invention.

Referring now to FIG. 2, a flow diagram illustrates a method for synchronization using a training signal. The method is designed for the VDSL multicarrier standard developed by T1E1.4, described above. The training signal is a DMT signal with cyclic prefix which consists of fixed and predetermined constellation points on even numbered carriers with a priori unknown message bits modulating the odd numbered carriers with the exception of carriers with indices 10m+9, with m being an integer.

Block 210 provides for performing a partial signal correlation that approaches an actual symbol boundary. The partial signal correlation minimizes ISI. After performing a partial signal correlation, block 220 provides for performing a carrier phase refinement to produce a more accurate symbol alignment estimate.

Block 220 can be implemented as a refining of the first symbol boundary estimate using the phase error between two adjacent carriers from an index set {10m+8, 10m+9, 11m; integer m}.

According to an embodiment, block 210 can be accomplished by one of at least two methods. A first method is illustrated in a flow diagram in FIG. 3.

Figure 3:
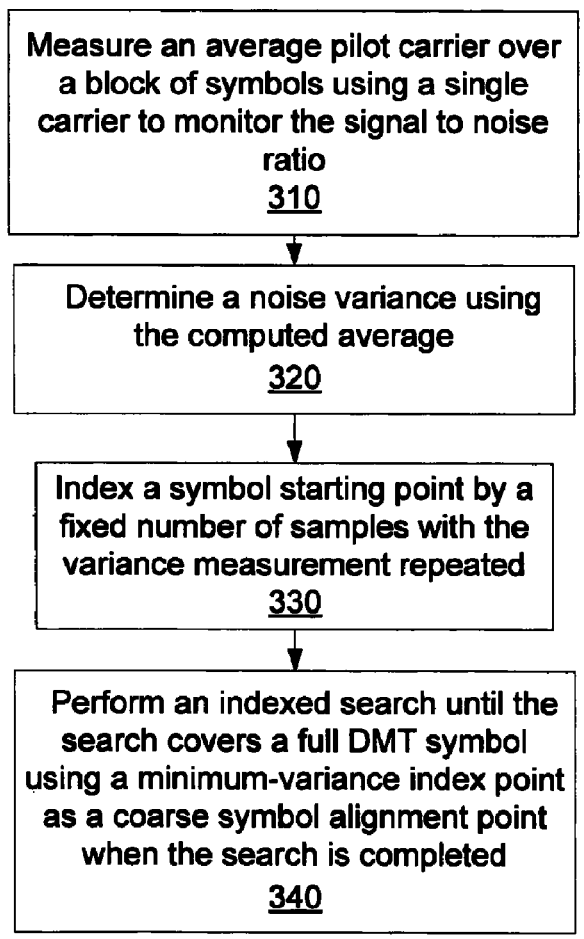
FIG. 3 is a flow diagram illustrating a method for performing a partial signal correlation that approaches an actual symbol boundary in accordance with an embodiment of the present invention.

Specifically, FIG. 3 illustrates a method for performing an exhaustive search implemented by beginning at an arbitrary initial symbol starting point within a receiver's time domain signal buffer. The method provides for measuring the noise variance on a selected carrier or group of carriers over a block of symbols. In an embodiment, the noise variance is the accumulated constellation error measured by first finding the average constellation over a block of symbols, then calculating the error for each symbol as the difference of the average minus the current carrier. In the embodiment, the error power is used because it is equal to the real component squared plus the imaginary component squared.

Block 310 provides for measuring an average pilot carrier over the block of symbols using a single carrier to monitor the signal to noise ratio. Block 320 provides for determining a noise measurement (the noise variance) using the computed average. Block 330 provides for indexing a symbol starting point, the indexing by a fixed number of samples with the variance measurement repeated. Block 340 provides for performing an indexed search until the search covers a full DMT symbol. The minimum noise variance value is maintained throughout the search along with the associated index value. The minimum-variance index point is then used as the coarse symbol alignment point when the search is completed.

The method described with reference to FIG. 3 uses a VDSL training signal that carries message data on approximately half of the active carriers. The VDSL training signal combined with the presence of a cyclic extension results in symbol boundary discontinuities as the data changes from symbol to symbol. The symbol discontinuities cause intersymbol interference (ISI) that have been discovered to correlate to the symbol alignment error.

Typically, a VDSL symbol structure consists of 4096 carriers with interleaved upstream and downstream passbands. A block of carriers at the high end of the 4096 available carriers is usually kept vacant to allow for an anti-aliasing guard band and to help satisfy the out-of-band PSD mask above the Nyquist frequency. The symbol rate is 4 kHz and a cyclic extension with typical length of 640 samples is inserted to give a sampling rate of (8192+640)*4000=35.328 MHz.

For the search, an embodiment provides that a pilot tone is selected and an indexing offset value is selected such that the index spans an integer number of pilot tone periods. Thus, a sample timing recovery system can maintain a constant phase reference as the assumed symbol alignment point is hopped through the search range. In one embodiment, the search uses features of the carriers that enable simplified calculations. For example, the first downstream passband includes carriers 32 through 869. Bin 64 has a sample period of 8192/64=128. Therefore, using bin 64 with an index value of 128 samples for a coarse search gives a symbol alignment resolution of 128. In the upstream channel, bin 1024 has a sinusoidal period of eight samples. The index can be any multiple of eight, including 128. Using a lower multiple of eight improves the resolution of the result. However, a timing recovery procedure is usually used only at the customer premise equipment because the central office modem 150 operates using a fixed sampling frequency. Thus, a symbol alignment search would not be subject to the index constraint mentioned above.

Figure 4:
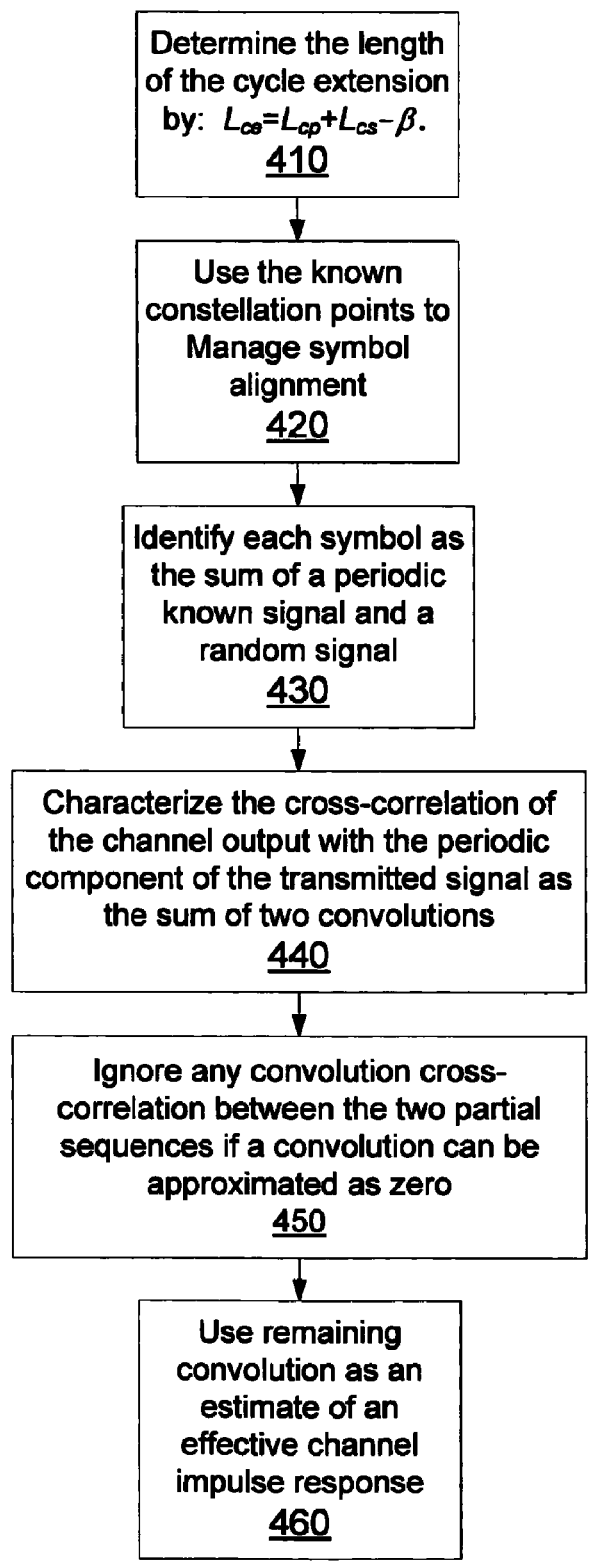
FIG. 4 is a flow diagram illustrating an alternative method for performing a partial signal correlation that approaches an actual symbol boundary in accordance with an embodiment of the present invention.

Referring now to FIG. 4, a flow diagram illustrates a second method for performing a partial signal correlation that approaches an actual symbol boundary. The second method uses features of the VDSL DMT signal and features of the known constellation points to manage symbol alignment. Specifically, the VDSL DMT signal structure is defined by a profile index n={0,1,2,3,4} which specifies the number of subcarriers $N_{sc}$={256,512,1024,2048,4096} and the length oβf the cyclic extension $L_{ce}$={40,80,160,320,640}. The symbol frequency is 4 kHz. Thus, the Nyquist sampling rate is [$2N_{sc}(n)+L_{ce}(n)$]*4000 samples/sec.

The method shown in FIG. 4 uses The cyclic extension includes a cyclic prefix (length $L_{cp}$) and a cyclic suffix (length $L_{cs}$), with an arbitrary overlap region there between, herein referred to as β. Thus, block 410 provides for determining the length of the cycle extension by: $L_{ce}=L_{cp}+L_{cs}-β$. In the time domain, the DMT time domain symbol is defined as:

$$x(k) = \sum_{i=0}^{2N_{sc}-1} Z'(i)e^{+j\frac{\pi k i}{2N_{sc}}} \quad k = 0, \cdots, 2N_{sc}-1 \qquad \text{Eqn. 1}$$

where $$Z'(i) = \begin{cases} Z(i) & i = 0, \cdots, N_{sc}-1 \\ conj(Z(2N_{sc}-i)) & i = N_{sc}, \cdots, 2N_{sc}-1 \end{cases} \qquad \text{Eqn. 2}$$

The training signal is such that all allowable tones are modulated in 4QAM (two-bit constellation, quadrature amplitude modulation) with the bit mapping defined in the following table:

TABLE 1

| Tone Index | Constellation Point |
|---|---|
| Even | 00 |
| 1, 11, 21, . . . , 10m+1 | Message bits 0, 1 |
| 3, 13, 23, . . . , 10m+3 | Message bits 2, 3 |
| 5, 15, 25, . . . , 10m+5 | Message bits 4, 5 |
| 7, 17, 27, . . . , 10m+7 | Message bits 6, 7 |
| 9, 19, 29, . . . , 10m+9 | 00 |

The constellation points are pseudo-randomly rotated by 0, π/2, π, or 3π/2, depending on the value of a 2-bit pseudo-random number d(2n),d(2n+1) wherein the bit generator is defined by $$d(n)=d(n-9)\oplus d(n-11) \qquad \text{Eqn. 3}$$

The scrambler that creates the pseudo-random number is reset at the start of every symbol during training. The training messages can consist of several bytes.

Block 420 provides for using the known constellation points (defined above) to manage symbol alignment. Block 430 provides for identifying each symbol as the sum of a periodic known signal and a random signal as $$x(k)=x_p(k)+x_r(k) \qquad \text{Eqn. 4}$$

where $x_p(k)$ is the signal with all odd carrier sub-symbols (excluding 10 m+9) set to zero, and $x_r(k)$ is the signal with all even sub-symbols (including 10 m+9) set to zero. The channel output is the convolution of the impulse response with the transmitted signal $$y(k)=h(k)*x(k)=h(k)*[x_p(k)+x_r(k)] \qquad \text{Eqn 5}$$

The cross-correlation of the channel output with the periodic component of the transmit signal is $$r_{y,x_p}(n_1, n_2) = E\{y(n_1)x_p(n_2)\} = E\left\{\sum_{l=0}^{M} h(l)x(n_1-l)x_p(n_2)\right\} \qquad \text{Eqn. 6}$$

$$= \sum_{l=0}^{M} h(l)E\{x(n_1-l)x_p(n_2)\} = \qquad \text{Eqn. 7}$$

$$\sum_{l=0}^{M} h(l)E\{[x_p(n_1-l)+x_r(n_1-l)]x_p(n_2)\}$$

$$= \sum_{l=0}^{M} h(l)[r_{p,r}(n_1-n_2-l)+r_{p,p}(n_1-n_2-l)] = h*r_{p,r}+h*r_{p,p} \qquad \text{Eqn. 8}$$

Block 440 and equations 6-8 provide for characterizing the cross-correlation of the channel output with the periodic component of the transmitted signal as the sum of two convolutions, one convolution between the channel impulse response and the cross-correlation between the signal with odd carrier sub-symbols set to zero and the signal with the even carrier sub-symbols set to zero; and one convolution between the channel impulse response and the autocorrelation of the signal with the odd carrier sub-symbols set to zero. Block 450 provides for ignoring the first convolution cross-correlation between the two partial sequences because the first convolution can be approximated as zero. The second convolution includes an autocorrelation sequence of the periodic signal that is approximately a delta function. Thus, block 460 provides for using the second convolution as an estimate of the effective channel impulse response. To determine the start of the impulse response, further analysis can be provided. The start of an impulse response refers to the initial point where impulse response energy becomes visible on a plot of the transmission path impulse response. The correlation method refers to the technique of obtaining an estimate of the channel impulse response by calculating the cross correlation of the transmitter and receiver signals. The delay between the start of the result of the correlation and the point where the impulse response is observable is used as the offset required to move a receiver FIFO pointer such that the modem will have discovered the first sample in subsequent DMT symbols. The result provides an initialization point for a carrier phase derived symbol alignment applicable to line-spectra DMT training sequences.

Figure 5:
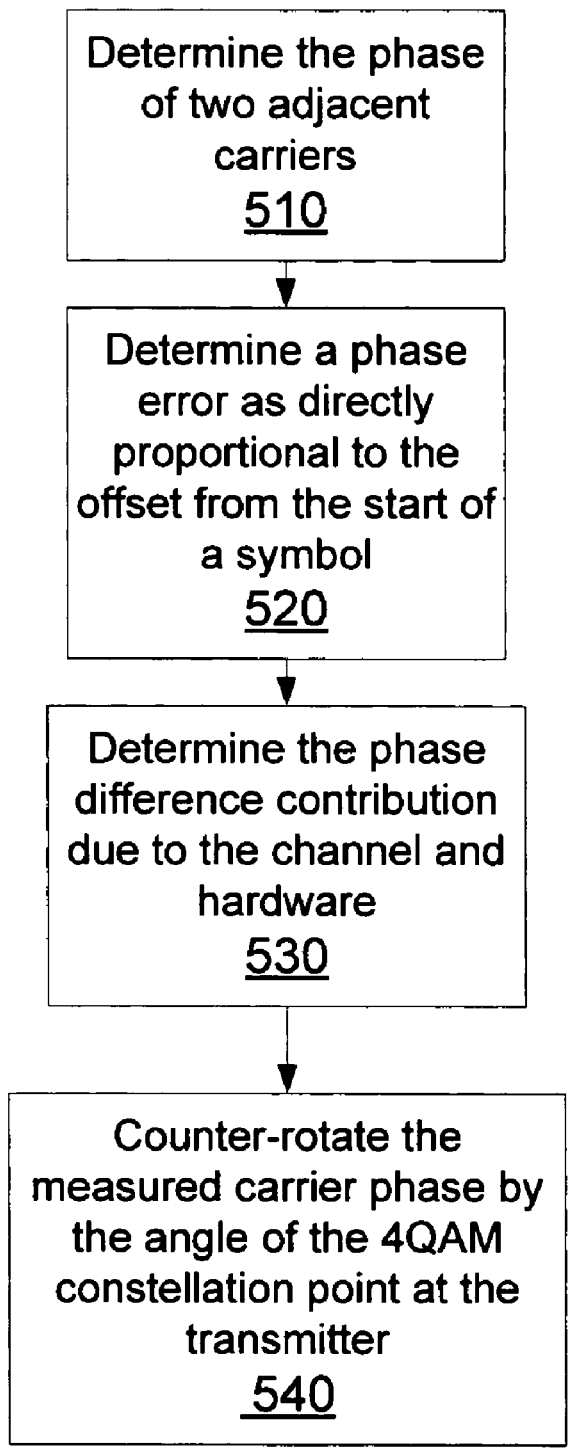
FIG. 5 is a flow diagram illustrating a method for performing a carrier phase refining to produce an accurate symbol alignment estimate in accordance with an embodiment of the present invention.

Block 220 refers to performing a refining for synchronization by performing a carrier phase refinement to produce a more accurate symbol alignment estimate. Referring to FIG. 5, a flow diagram illustrates how a refinement is achieved according to an embodiment.

Block 510 provides for determining the phase of two adjacent carriers. More specifically, the phase can be determined from the set $\{10m+8, 10m+9, 11m; \text{integer } m\}$. Block 520 provides for determining a phase error as directly proportional to the offset from the start of a symbol. More particularly, the phase difference between two adjacent DMT carriers varies linearly between 0 and $2\pi$ as the offset varies from 0 to 1 full symbol length. Block 530 provides for determining the phase difference contribution due to the channel and hardware, which can be assumed nearly constant over the channels of interest. Block 540 provides for counter-rotating the measured carrier phase by the angle $\{\pi/4, 3\pi/4, 5\pi/4, 7\pi/4\}$ of the 4QAM constellation point at the transmitter.

Carriers at frequencies $f_1 = p^* f_0$ and $f_2 = (p+1)^* f_0 = f_1 + f_0$, where $f_0$ is the DMT fundamental (first carrier), can be used to generate the phase measurements. If the constant offset resulting from the constant phase difference due to the channel and hardware phase response is $k_c$, then an expression for the offset estimate $\delta$ follows as $$\delta = (N\Delta\phi_{offset})/(2\pi) - k_c \qquad \text{Eqn. 9}$$

where N is the symbol length and $\Delta\phi_{offset}$ is the compensated phase error given by $$\Delta\phi_{offset} = \Delta\phi_{offset1} - \Delta\phi_{offset2} = (\phi_1 - \phi_{data1}) - (\phi_2 - \phi_{data2}) \qquad \text{Eqn. 10}$$

The constellation counter-rotations are represented above $\phi_{data1}$ and $\phi_{data2}$. The channel and hardware phase response k can be determined empirically or calculated from $k_c = (N\Delta\phi_{channel})/(2\pi)$ where $\Delta\phi_{channel}$ is the phase difference between carriers $f_1$ and $f_2$. Averaging the measured phase angles over several symbols minimizes the already small effects of ISI on the fine displacement estimate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for performing symbol boundary synchronization in a communication system, the method comprising:
    generating a symbol alignment estimate from a partial signal correlation by:
        identifying symbols in a transmitted signal as a sum of a periodic known signal and a random signal;
        characterizing a cross-correlation of a channel output with the periodic component of the transmitted signal as a sum of a first convolution and a second convolution, the first convolution being a cross-correlation between two partial sequences, the second convolution being an estimate of an effective channel impulse response; and
        determining the symbol alignment estimate based in part on at least one of the cross-correlation of the channel output with the periodic component of the transmitted signal or known constellation points;
    refining the symbol alignment estimate via a carrier phase calculation, the refining including:
        determining a respective carrier phase of each of two adjacent carriers, the two adjacent carriers including a first carrier at frequencies $f_1 = p^* f_0$ and a second carrier at frequencies $f_2 = (p+1)^* f_0 = f_1 + f_0$, $f_0$ being a discrete multi-tone (DMT) fundamental frequency and p being a positive integer;
        determining a phase error based at least in part on a carrier phase difference between the two adjacent carriers as directly proportional to an offset from the start of a symbol of a block of the symbols;
        determining a phase difference contribution due to a communication channel and hardware;
        counter-rotating the determined carrier phase of the first carrier and the second carrier based on an angle of a constellation point at a transmitter, wherein an estimate of the offset, δ, is expressed as $\delta=(N\Delta\phi_{offset})/(2\pi)-k_c$ in an event that the offset resulting from the phase difference due to the communication channel and hardware phase response is $k_c$, N being a symbol length, $\Delta\phi_{offset}$ being a compensated phase error of the first carrier and the second carrier; and refining the symbol alignment estimate based in part on the compensated phase error.

2. The method of claim 1 wherein the refining reduces intersymbol interference (ISI) and symbol alignment error.

3. The method of claim 1 wherein the symbol boundary synchronization uses features of carriers that enable simplified calculations.

4. The method of claim 3 wherein a bin value is chosen to enable a symbol alignment resolution that is a power of two.

5. The method of claim 3 wherein for an upstream channel, an index value is chosen that is any multiple of eight.

6. The method of claim 1 wherein the generating the symbol alignment estimate includes receiving a training signal wherein all allowable tones are modulated by a two-bit constellation, quadrature amplitude modulation with a bit mapping defined according to a table.

7. The method of claim 1 wherein the angle is one of $\pi/4$, $3\pi/4$, $5\pi/4$, or $7\pi/4$ of a two bit, quadrature amplitude modulation constellation point.

8. A communication system for symbol synchronization, the communication system comprising:

a symbol alignment estimate generator to generate a symbol alignment estimate, the symbol alignment estimate generator to:

identify symbols in a transmitted signal as a sum of a periodic known signal and a random signal;

characterize a cross-correlation of a channel output with the periodic component of the transmitted signal as a sum of a first convolution and a second convolution, the first convolution being a cross-correlation between two partial sequences, the second convolution being an autocorrelation of a partial sequence;

determine the symbol alignment estimate based in part on at least one of the cross-correlation of the channel output with the periodic component of the transmitted signal or known constellation points; and perform an indexed search of the symbols until the search covers a full discrete multi-tone (DMT) symbol; and a carrier phase calculator configured to refine the symbol alignment estimate, the carrier phase calculator configured to:

determine a respective carrier phase of each of two adjacent carriers, the two adjacent carriers including a first carrier at frequencies $f_1=p*f_0$ and a second carrier at frequencies $f_2=(p+1)*f_0=f_1+f_0$, $f_0$ being a discrete multi-tone (DMT) fundamental frequency and p being a positive integer, determine a phase error, based at least in part on a carrier phase difference between the first carrier and the second carrier, as directly proportional to an offset from the start of at least one of the symbols;

determine a phase difference contribution due to a communication channel and hardware;

counter-rotate the determined carrier phase of at least one of the first carrier or the second carrier based on an angle of a constellation point, wherein an estimate of the offset, δ, is expressed as $\delta=(N\Delta\phi_{offset})/(2\pi)-k_c$ in an event that the offset resulting from the phase difference due to the communication channel and hardware phase response is $k_c$, N being a symbol length, $\Delta\phi_{offset}$ being a compensated phase error of at least one of the first carrier or the second carrier; and refine the symbol alignment estimate based in part on the compensated phase error.

9. The communication system of claim 8 wherein the search uses features of carriers that enable simplified calculations.

10. A method comprising:

using known constellation points to determine a current symbol alignment;

identifying each symbol in the current symbol alignment as a sum of a periodic known signal and a random signal;

characterizing a cross-correlation of a channel output with the periodic component of a transmitted signal as a sum of a first convolution and a second convolution;

ignoring the first convolution, the first convolution being a cross-correlation between two partial sequences and approximated as zero;

using the second convolution as an estimate of an effective channel impulse response;

determining a respective carrier phase of each of two adjacent carriers, the two adjacent carriers including a first carrier at frequencies $f_1=p*f_0$ and a second carrier at frequencies $f_2=(p+1)*f_0=f_1+f_0$, $f_0$ being a discrete multi-tone (DMT) fundamental frequency and p being a positive integer;

determining a phase error based at least in part on a carrier phase difference between the two adjacent carriers as directly proportional to an offset from the start of a symbol of a block of symbols;

determining a phase difference contribution due to a communication channel and hardware;

counter-rotating the determined carrier phase of the first carrier and the second carrier based on an angle of a constellation point, wherein an estimate of the offset, δ, is expressed as $\delta=(\Delta\phi_{offset})/(2\pi)-k_c$ in an event that the offset resulting from the phase difference due to the communication channel and hardware phase response is $k_c$, N being a symbol length, $\Delta\phi_{offset}$ being a compensated phase error given by $\Delta\phi_{offset}=\Delta\phi_{offset1}-\Delta\phi_{offset2}$, $k_c$ being expressed by $k_c=(N\Delta\phi_{channel})/(2\pi)$, $\Delta\phi_{channel}$ being a phase difference between the first carrier and the second carrier, $\Delta\phi_{offset1}$ being a compensated phase error of the first carrier, $\Delta\phi_{offset2}$ being a compensated phase error of the second carrier; and refining the current symbol alignment based in part on the compensated phase error.

11. The method of claim 10 wherein the first convolution and the second convolution sum can be characterized by: $h*r_{p,p}+h*r_{p,r}$, wherein h represents a transfer function and $r_{pp}$ represents an autocorrelation with odd carrier sub-symbols set to zero and $r_{p,r}$ represents a cross-correlation between the signal with odd carrier sub-symbols set to zero and the signal with the even carrier sub-symbols set to zero.

12. The method of claim 10 wherein the known constellation points are constellation points that are pseudo-randomly rotated by 0, $\pi/2$, $\pi$, or $3\pi/2$, according to a 2-bit pseudo-random number $d(2n),d(2n-1)$ wherein the bit generator is defined by $d(n)=d(n-9)\oplus d(n-11)$, where n is an integer value greater or equal to zero.

* * * * *